United States Patent
Motomura et al.

(10) Patent No.: US 6,646,702 B1
(45) Date of Patent: *Nov. 11, 2003

(54) LIQUID CRYSTAL DISPLAY DEVICE HAVING A SEMI-TRANSMISSIVE DIELECTRIC FILM

(75) Inventors: Toshiro Motomura, Kagoshima-ken (JP); Hiromi Fukuoka, Kagoshima-ken (JP); Mitsuo Miyazaki, Kagoshima-ken (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,777

(22) Filed: Mar. 28, 2000

(30) Foreign Application Priority Data

Mar. 31, 1999 (JP) ............................................ 11-093463

(51) Int. Cl.[7] ...................... G02F 1/1335; G02F 1/1333
(52) U.S. Cl. ........................... 349/122; 349/65; 349/71; 349/96; 349/112; 349/114; 349/119
(58) Field of Search ........................... 349/122, 61, 65, 349/71, 96, 112, 119, 106, 114

(56) References Cited

U.S. PATENT DOCUMENTS

| | | | | |
|---|---|---|---|---|
| 4,822,144 A | * | 4/1989 | Vriens | 349/71 |
| 4,882,617 A | * | 11/1989 | Vriens | 348/779 |
| 5,017,825 A | * | 5/1991 | Heijnen et al. | 313/112 |
| 5,138,222 A | * | 8/1992 | Toide et al. | 313/474 |
| 5,179,318 A | * | 1/1993 | Maeda et al. | 313/466 |
| 5,892,561 A | * | 4/1999 | Suzuki et al. | 349/122 |
| 6,008,871 A | * | 12/1999 | Okumura | 349/61 |
| 6,222,598 B1 | * | 4/2001 | Hiyama et al. | 349/65 |
| 6,356,322 B1 | * | 3/2002 | Shimura | 349/65 |

FOREIGN PATENT DOCUMENTS

| | | |
|---|---|---|
| JP | 50 57459 | 5/1975 |
| JP | 02-173602 | 7/1990 |
| JP | 04-282613 | 10/1992 |
| JP | 05-045511 | 2/1993 |
| JP | 07318929 | 12/1995 |
| JP | 08-166585 | 6/1996 |
| JP | 08292413 | 11/1996 |
| JP | 08-292413 | 11/1996 |
| JP | 08-292428 | 11/1996 |
| JP | 10-073815 | 3/1998 |
| JP | 10-228027 | 8/1998 |
| JP | 10282492 | 10/1998 |
| JP | 11-038397 | 2/1999 |
| JP | 11052366 | 2/1999 |
| JP | 11344726 A | * 12/1999 |

* cited by examiner

Primary Examiner—Julie Ngo
(74) Attorney, Agent, or Firm—Rabin & Berdo, P.C.

(57) ABSTRACT

In a liquid crystal display device according to the present intention, a retardation plate and a polarizer plate are stacked on one side of a liquid crystal panel. A second retardation plate and a second polarizer plate are stacked in the other side of liquid crystal panel. The liquid crystal panel has a pair of transparent substrates, i.e., a first transparent substrate and second transparent substrate, and nematic liquid crystal layer is interposed between the pair of transparent substrates. A semi-transmissive film is provided on an inner surface of the second transparent substrate. The semi-transmissive film has both a light reflective property and a light transmissive property, and is totally composed of a dielectric material. More specifically, the semi-transmissive film has a multi-layered laminate structure including high refractivity dielectric layers and low refractivity dielectric layers stacked in an alternating relation.

8 Claims, 8 Drawing Sheets

LIQUID CRYSTAL DISPLAY DEVICE HAVING A SEMI-TRANSMISSIVE DIELECTRIC FILM

This application is based on Japanese Patent Application No. 11-93463 (1999), the content of which is incorporated hereinto by reference.

BACKGROUND OF THE INVENTION

1. Field of the Invention

The present invention relates to a semi-transmissive liquid crystal display device having a semi-transmissive film. More particularly, the invention relates to a liquid crystal display device operable both in a reflective mode and in a transmissive mode.

2. Description of the Related Art

In recent years, liquid crystal display devices have widely been employed as display devices for small-and medium-size notebook personal computers and other portable information terminals and as large-scale monitors. In general, the liquid crystal display devices for the portable information terminals are semi-transmissive STN liquid crystal display devices for indoor and outdoor use.

Such a semi-transmissive liquid crystal display device is operative in a reflective mode in external illumination such as sunlight or fluorescent light, and in a transmissive mode which utilizes a backlight as internal illumination. For the operation in the reflective and transmissive modes, use of a semi-transmissive film has been proposed (see Japanese Unexamined Patent Publication No. 8-292413 (1996), for example).

The semi-transmissive film is conventionally comprised of a thin metal film such as of aluminum or chromium. In the reflective mode, the semi-transmissive film functions as a reflective film. In the transmissive mode, the semi-transmissive film functions as a transmissive film.

Use of a semi-transmissive film in a liquid crystal display device of active matrix type has also been proposed (see Japanese Unexamined Patent Publication No. 7-318929 (1995), for example). The semi-transmissive film for use in the active matrix liquid crystal display device is comprised of a thin metal film such as of aluminum or an aluminum-based alloy, or a laminate film comprising a transparent conductive film such as an ITO film and a metal film.

In the conventional semi-transmissive liquid crystal display devices, the semi-transmissive films do not sufficiently satisfy the requirements for the light transmitting property and the light reflecting property. In other words, the conventional semi-transmissive liquid crystal display devices cannot offer satisfactorily improved performance in the reflective and transmissive modes.

To overcome the aforesaid drawback, it is a principal object of the present invention to provide a high performance semi-transmissive liquid crystal display device which offers satisfactorily improved performance both in the reflective mode and in the transmissive mode.

It is another object of the invention to provide a semi-transmissive film suitable for use in the semi-transmissive liquid crystal display device.

It is further another object of the invention to provide a semi-transmissive liquid crystal display device which features a greater viewing angle and a greater viewable area for image display.

SUMMARY OF THE INVENTION

The liquid crystal display device according to the present invention is operable both in the reflective mode and in the transmissive mode. For this purpose, the liquid crystal display device has a semi-transmissive film which functions as a reflective film in the reflective mode, and as a transmissive film in the transmissive mode.

The semi-transmissive film is totally composed of a dielectric material. More specifically, the semi-transmissive film has a multi-layered laminate structure which comprises high refractivity dielectric layers and low refractivity dielectric layers. The high refractivity layers and the low refractivity layers are simply different in refractivity. When the liquid crystal display device with the semi-transmissive film having such a construction is operative in the reflective mode, light rays incident on the semi-transmissive film are partly reflected by the high refractivity layers, and light rays transmitted through the high refractivity layers are reflected by the low refractivity layers. The reflected light rays interfere with each other, so that so-called reflection enhancement occurs to remarkably enhance the reflecting property of the semi-transmissive film. Therefore, the liquid crystal display device ensures clear image display in a liquid crystal layer with little reduction in brightness thereof.

When the liquid crystal display device is operative in the transmissive mode, light rays from a backlight pass through the semi-transmissive film to enter a liquid crystal panel, and exit from a display surface side of the liquid crystal display device. Therefore, the liquid crystal display device also ensures clear image display in the transmissive mode.

The features and effects of the present invention will become more apparent from the following description of the preferred embodiments with reference to the attached drawings.

DESCRIPTION OF THE PREFERRED EMBODIMENTS

Figure 1:
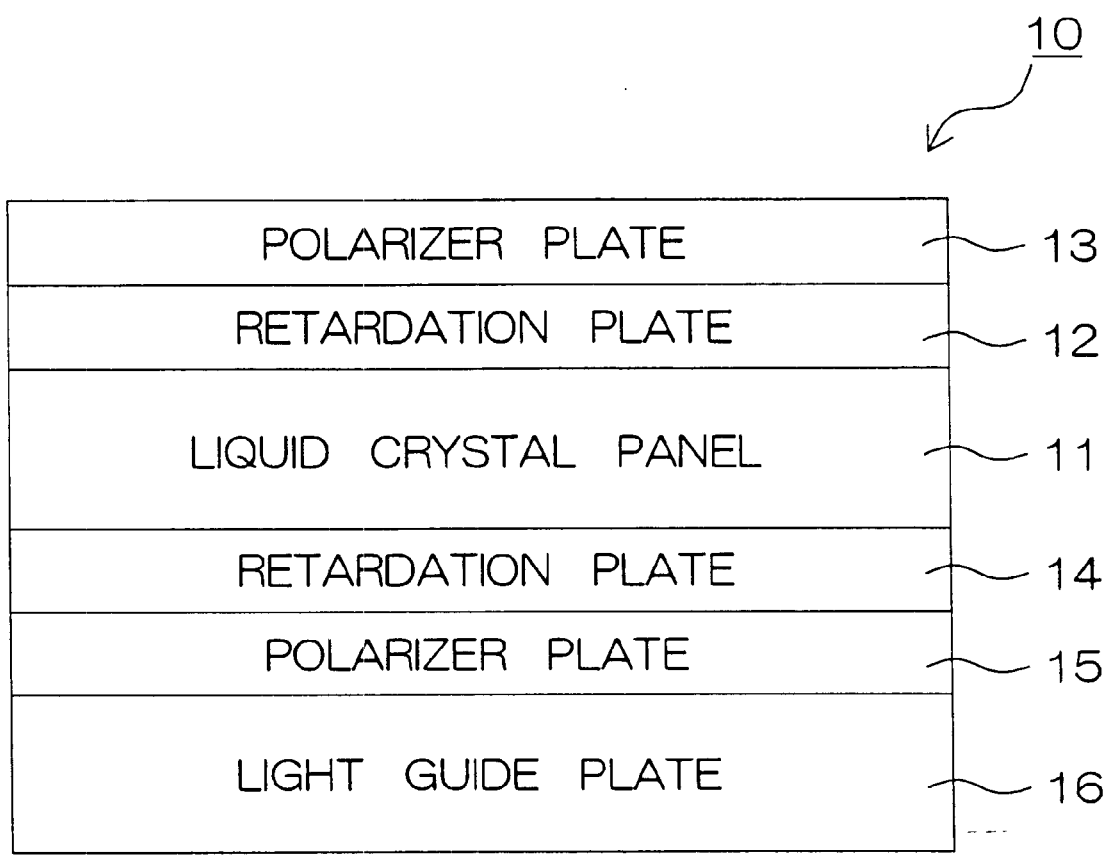
FIG. 1 is a schematic sectional view illustrating the construction of a semi-transmissive liquid crystal display device 10 according to one embodiment of the present invention.

FIG. 1 is a schematic sectional view illustrating the construction of a semi-transmissive liquid crystal display device 10 according to one embodiment of the present invention.

In FIG. 1, a reference numeral 11 denotes a liquid crystal panel. A retardation plate 12 such as of a polycarbonate and an iodine-based polarizer plate 13 are stacked in series on one surface of the liquid crystal panel 11 (on the upper side in FIG. 1). A retardation plate 14 such as of a polycarbonate and an iodine-based polarizer plate 15 are stacked in series on the other surface of the liquid crystal panel 11 (on the lower side in FIG. 1). These components are bonded to each other with an acrylic adhesive. Further, a light guide plate 16 such as of an acrylic resin plate for guiding light illumination is provided on a surface of the polarizer plate 15. Light emitted from a light source not shown is guided to the entire polarizer plate 15 through the light guide plate.

Figure 2:
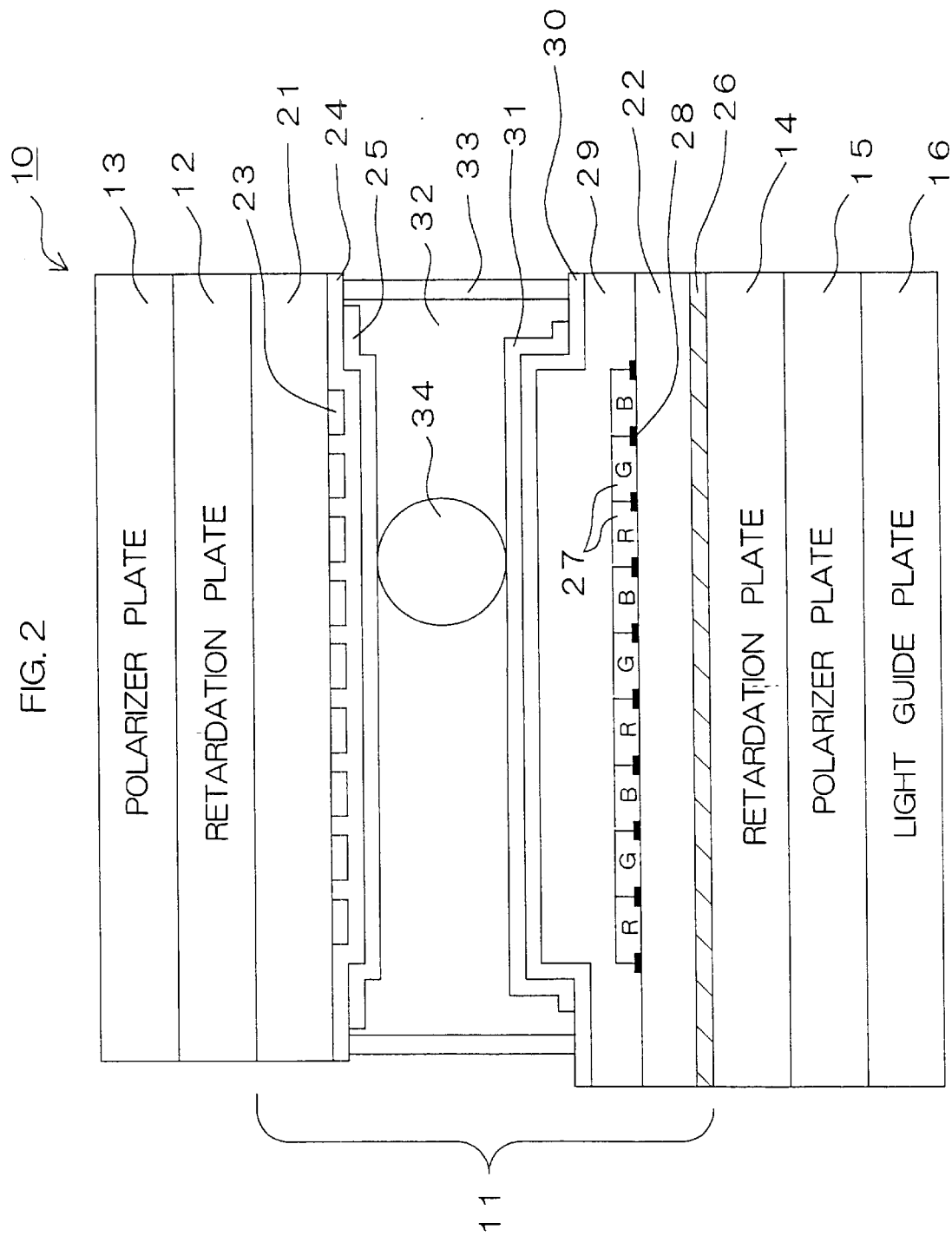
FIG. 2 is an enlarged sectional view of the liquid crystal display device 10 shown in FIG. 1.

In FIG. 1, the liquid crystal display device 10 has a display surface on the upper side thereof, so that images such as of characters and figures displayed by the liquid crystal are viewed from the upper side thereof. FIG. 2 is an enlarged sectional view of the liquid crystal display device 10 shown in FIG. 1, illustrating the liquid crystal panel 11 in greater detail on a larger scale. In FIGS. 1 and 2, the respective components are shown as each having a convenient thickness for illustration but, in reality, have different thicknesses.

Referring to FIG. 2, the liquid crystal panel 11 has a first glass substrate 21 and a second glass substrate 22 opposed to each other. The first glass substrate 21 is located on a segment side, while the second glass substrate 22 is located on a common side. A multiplicity of transparent electrodes 23 such as of ITO are provided as extending parallel to each other on an inner surface of the first glass substrate 21, and an insulation layer 24 such as of $SiO_2$ and an orientation film 25 such as of a polyimide resin unidirectionally rubbed are stacked over the transparent electrodes 23.

A semi-transmissive film 26 is provided on an outer surface of the glass substrate 22 on the common side. The semi-transmissive film 26 has both a light transmitting property and a light reflecting property and, in addition, is adapted to produce no phase retardation in the light passing through the two polarizer plates 13, 15. The semi-transmissive film 26 may have a mirror-like surface or a light scattering surface.

The semi-transmissive film 26 comprises dielectric layers. More specifically, the semi-transmissive film 26 has a laminate structure which includes high refractivity layers A and low refractivity layers B stacked in an alternating relation on the surface of the glass substrate 22. Thus, light rays incident through the glass substrate 22 are partly reflected by the high refractivity layers A, and light rays transmitted through the high refractivity layers A are reflected by the low refractivity layers B. The reflected light rays interfere with each other, so that so-called reflection enhancement occurs to remarkably enhance the reflecting property of the semi-transmissive film.

The high refractivity layers A and the low refractivity layers B may be composed of any dielectric materials as long as the layers A and B are different in refractivity. For example, the high refractivity layers A are preferably composed of $TiO_2$, $ZrO_2$, $SnO_2$ or the like, and have a refractivity of 2.0 to 2.5. The low refractivity layers B are preferably composed of $SiO_2$, $AlF_3$, $CaF_2$ or the like, and have a refractivity of 1.3 to 1.6.

Where the high refractivity layers A each have a thickness of 25 to 2000 Å and the low refractivity layers each have a thickness of 25 to 2000 Å, the aforesaid reflection enhancement effect is remarkable. Where the overall thickness of the semi-transmissive film 26 is 50 to 12000 Å, the reflection enhancement effect is further remarkable.

As described above, the semi-transmissive film 26 is totally composed of dielectric materials. That is, the semi-transmissive film 26 has a multi-layer laminate structure in which the high refractivity dielectric layers A and the low refractivity dielectric layers B are stacked in an alternating relation. This is a feature of the semi-transmissive film 26 according to this embodiment.

An undercoat layer D such as of $SiO_2$ may be interposed between the glass substrate 22 and an adjacent one of the high refractivity layers A. Further, a protective layer C such as of $SiO_2$ may be provided on the semi-transmissive film 26. Formation of the undercoat layer D and the protective layer C may be achieved by dipping, printing, vapor deposition or sputtering.

Referring again to FIG. 2, R (red), G (green) and B (blue) color filters 27 and a black matrix 28 are provided on an inner surface of the glass substrate 22 on the common side. A set of RGB color filters 27 are provided for each pixel. The black matrix 28, which is composed of metal chromium or a photo-resist, separates the respective color fillers 27.

Formation of the color filters 27 may be achieved by a pigment dispersing method. More specifically, pigment-dispersed photo-resists are applied on the glass substrate 22 and the color filters 27 are formed in desired positions thereon by a photolithography method.

An overcoat layer 29 of an acrylic resin is provided over upper surfaces of the color filters 27, and a multiplicity of transparent electrodes 30 such as of ITO are provided as extending parallel to each other on an upper surface of the overcoat layer 29. The transparent electrodes 30 extend perpendicularly to the transparent electrodes 23 provided on the segment side. An orientation film 31 of a polyimide resin unidirectionally rubbed is provided over upper surfaces of the transparent electrodes 30.

The first glass substrate 21 on the segment side having the transparent electrodes 23, the insulation layer 24 and the orientation film 25 is disposed as opposed to the second glass substrate 22 on the common side having the color filters 27, the black matrix 28, the overcoat layer 29, the transparent electrodes 30 and the orientation film 31 with the orientation films 25 and 31 being spaced a predetermined distance from each other. A chiral nematic liquid crystal with molecules thereof twisted at an angle of 200 to 270 degrees is filled in a space defined between the orientation films 25 and 31 to form a liquid crystal layer 32, and the periphery of the glass substrates 21, 22 is sealed with a sealant 33. Further, transparent spacers 34 (e.g., 2000 spacers/10 mm$^2$) are dispersed in the liquid crystal layer 32 to allow the liquid crystal layer 32 to have a uniform thickness.

In FIG. 2, the provision of the insulation layer 24 and the overcoat layer 29 may be dispensed with.

Where the liquid crystal display device 10 according to this embodiment is operative in the reflective mode, external illumination light such as sunlight or fluorescent light passes through the polarizer plate 13 on the display surface side and the retardation plate 12 into the liquid crystal panel 11. In the liquid crystal panel 11, the light passes through the first glass substrate 21, the transparent electrodes 23, the insulation layer 24, the orientation film 25, the liquid crystal layer 32, the orientation film 31, the transparent electrodes 30, the overcoat layer 29, the color filters 27 and the second glass substrate 22, and reflected on the semi-transmissive film 26. The reflected light passes through the liquid crystal panel 11, the retardation plate 12 and the polarizer plate 13, and exits to the front side of the liquid crystal display device. At this time, the intensity of the reflected light is increased by the aforesaid reflection enhancement effect by the semi-transmissive film 26. As a result, reduction in the brightness of the liquid crystal display device is suppressed to ensure clear image display in the liquid crystal layer 32.

Where the liquid crystal display device 10 is operative in the transmissive mode, illumination light guided from the light source into the light guide plate 16 passes through the polarizer plate 15, the retardation plate 14 and the semi-transmissive film 26 into the liquid crystal panel 11. The light transmitted through the liquid crystal panel 11 passes through the retardation plate 12 and the polarizer plate 13 to exit from the display surface side.

After the light guided through the light guide plate 16 passes through the polarizer plate 15, the polarization state of the light is changed by the retardation plate 14. Therefore, the liquid crystal display device is properly operable in the transmissive mode even with the liquid crystal layer 32 of the liquid crystal panel 11 being optimally conditioned for the reflective mode. More specifically, the retardation plate 14 is conditioned so that the light emitted from the light guide plate 16 has the same polarization state as the light reflected on the semi-transmissive film 26 in the reflective mode.

Thus, the liquid crystal display device 10 ensures stable color display both in the reflective mode and in the transmissive mode.

Figure 4:
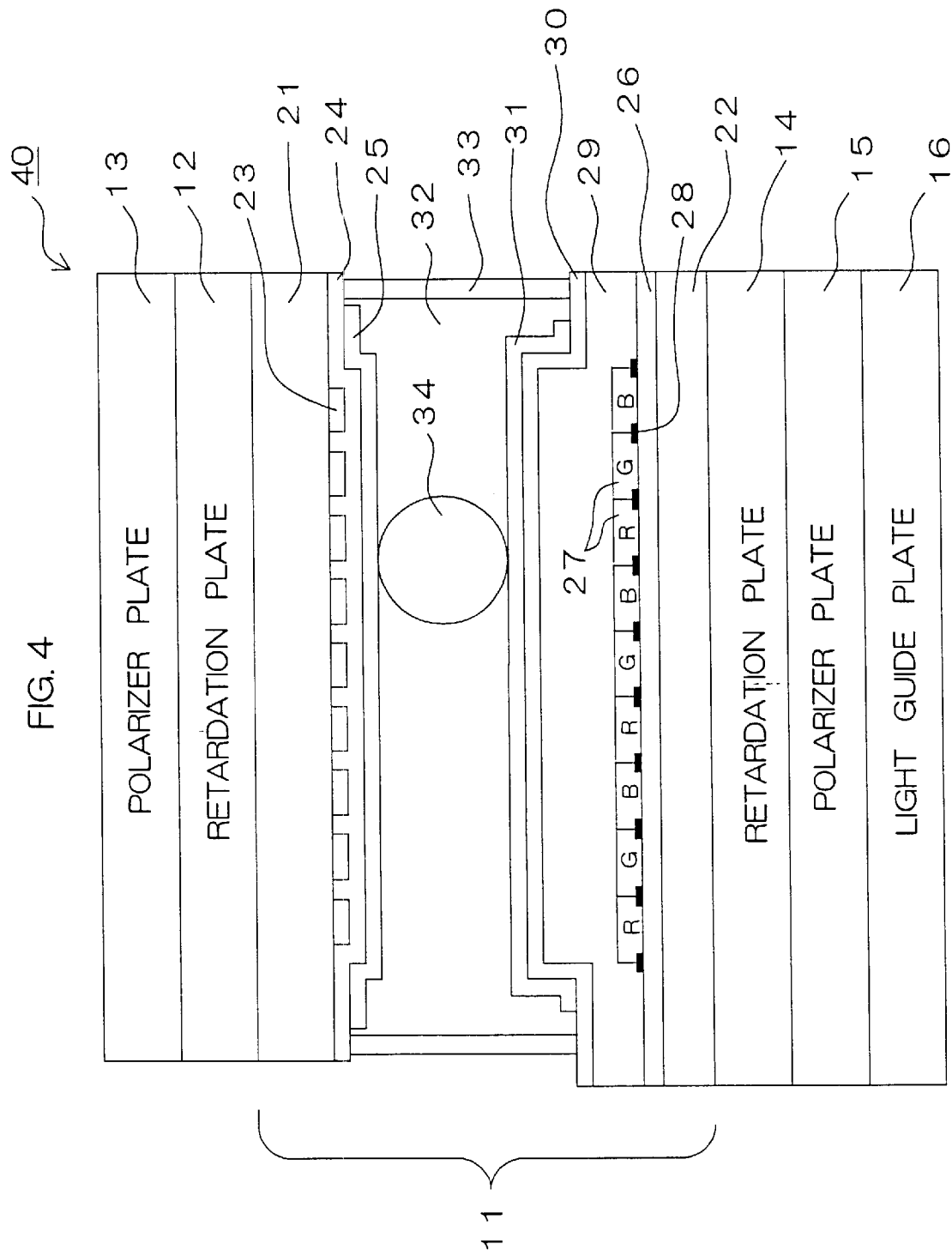
FIG. 4 is a schematic sectional view illustrating the construction of a liquid crystal display device 40 according to another embodiment of the invention.

FIG. 4 is a sectional view schematically illustrating the construction of a liquid crystal display device 40 according to another embodiment of the invention. In the liquid crystal display device 40 shown in FIG. 4, the components identical to or corresponding to the components of the liquid crystal display device 10 shown in FIG. 2 are denoted by the same reference characters as in FIG. 2, and no explanation will be given thereto.

In the liquid crystal display device 40, the semi-transmissive film 26 is provided not on the outer surface of the second glass substrate 22 on the common side but on the inner surface of the glass substrate plate 22. The color filters 27 and the black matrix 28 are provided on the semi-transmissive film 26.

The liquid crystal display device 40 shown in FIG. 4 has substantially the same construction as the liquid crystal display device 10 shown in FIG. 2, except that the semi-transmissive film 26 is thus provided on the inner surface of the glass substrate 22 on the common side.

Figure 3:
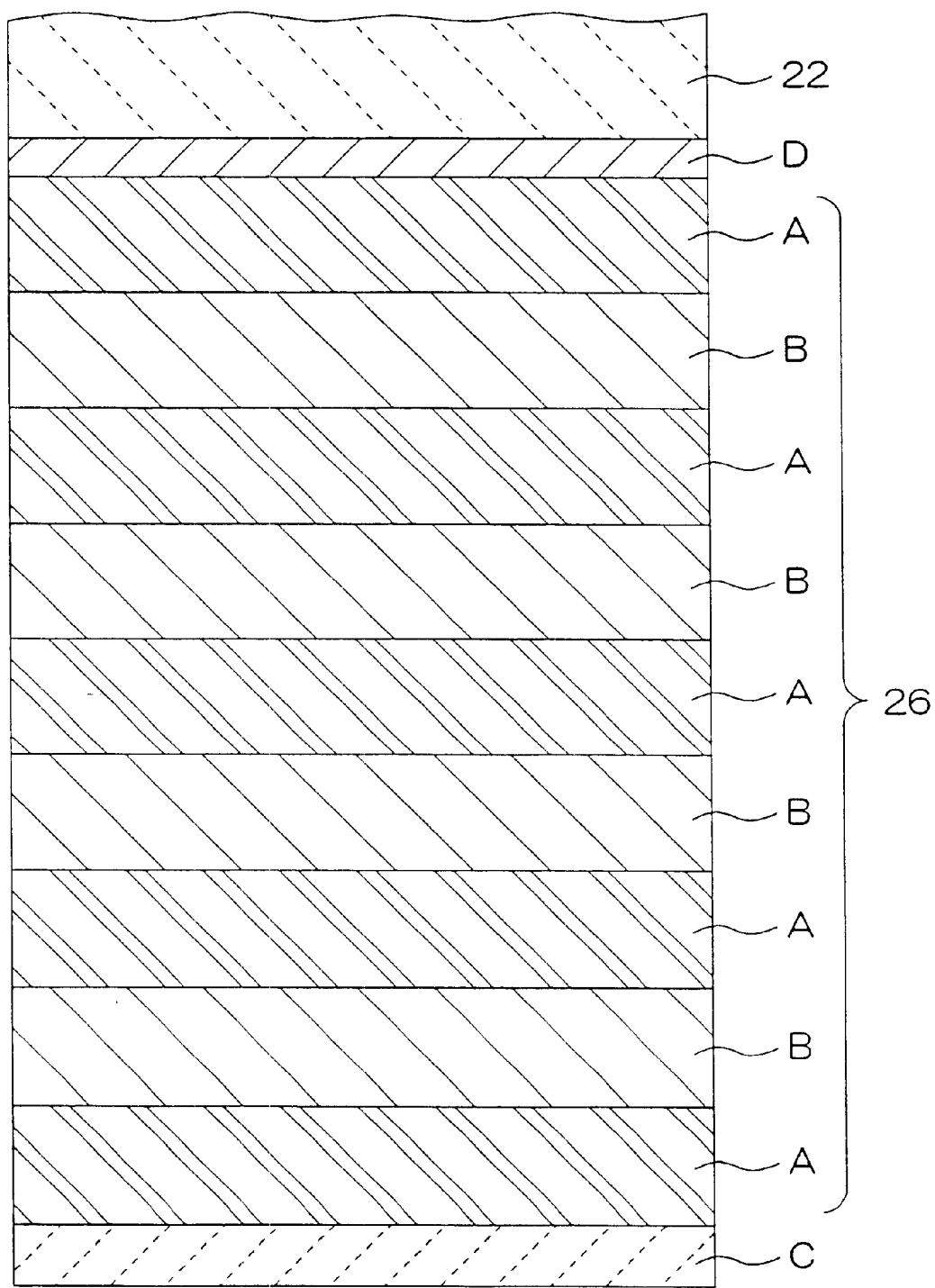
FIG. 3 is a schematic diagram illustrating an exemplary laminate structure of a semi-transmissive film 26.

The semi-transmissive film 26 has a laminate structure, as in FIG. 3, which includes high refractivity layers A and low refractivity layers B stacked in an alternating relation. An undercoat layer D such as of $SiO_2$ is preferably interposed between the inner surface of the glass substrate 22 and an adjacent one of the high refractivity layers A. Further, a protective layer C such as of $SiO_2$ is preferably provided on the topmost layer of the semi-transmissive film 26. The provision of the protective layer C is advantageous to ensure easy formation of the color filters 27.

The liquid crystal display device 40 shown in FIG. 4 offers the same effects as the liquid crystal display device 10 described with reference to FIG. 2 and, in addition, the following effects.

Since the semi-transmissive film 26 is provided on the inner surface of the second glass substrate 22, external illumination light is reflected on the semi-transmissive film 26 before entering the glass substrate 22 in the reflective mode. Therefore, the liquid crystal display device is free from doubling of a display image which may otherwise occur due to passage of light through the glass substrate 22. Further, light incident on a pixel including a set of RGB color filters is reflected back through the same pixel, so that reduction in the brightness and color purity of the display device is prevented.

Figure 5:
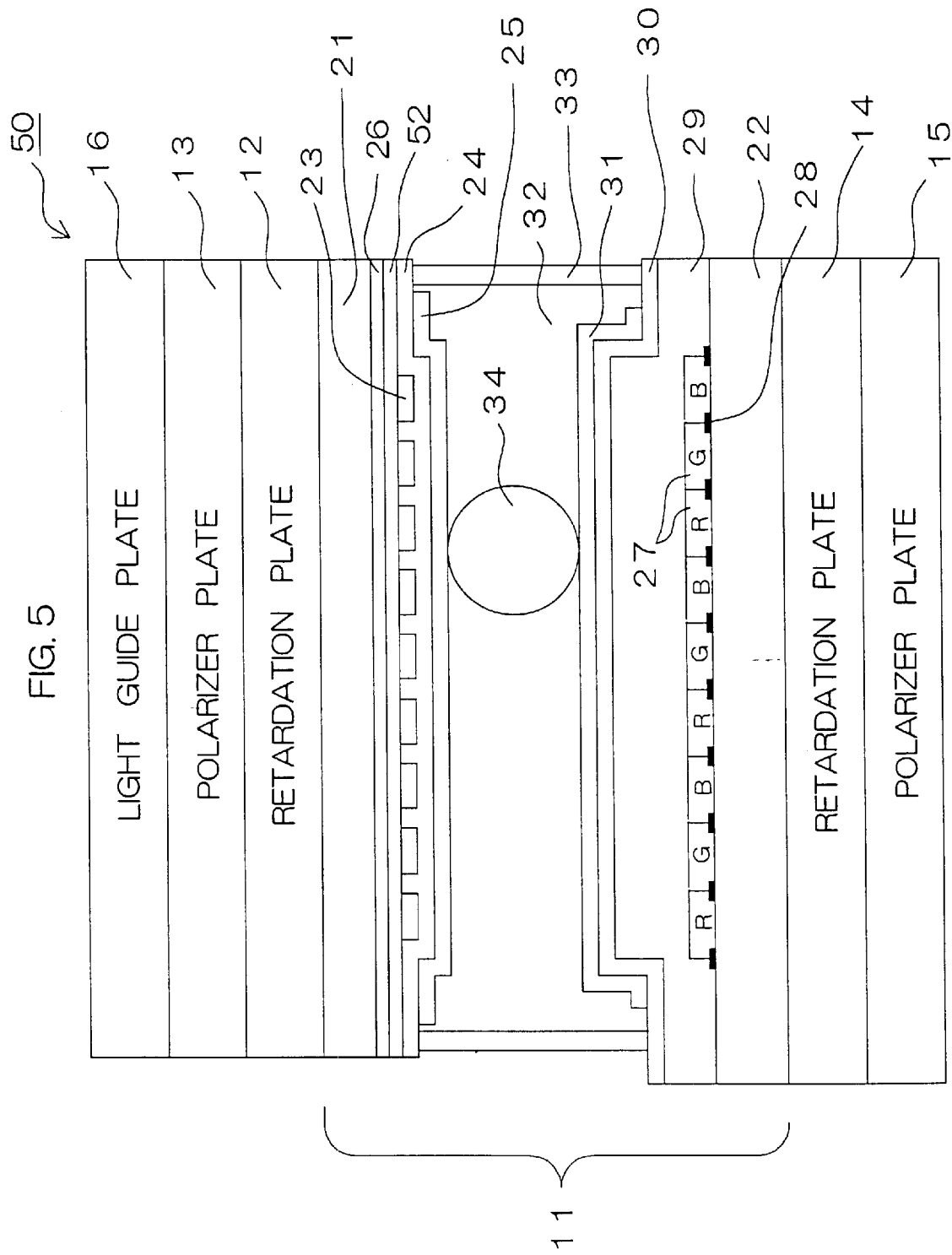
FIG. 5 is a schematic sectional view illustrating the construction of a liquid crystal display device 50 according to further another embodiment of the invention.

FIG. 5 is a sectional view schematically illustrating the construction of a liquid crystal display device 50 according to further another embodiment of the invention. In FIG. 5, the components identical to or corresponding to those shown in FIGS. 2 and 4 are denoted by the same reference characters as in FIGS. 2 and 4, and no explanation will be given thereto.

In the liquid crystal display device 50 shown in FIG. 5, the light guide plate 16 for backlighting is provided not on the surface of the polarizer plate 15 but on the surface of the polarizer plate 13. Therefore, the surface of the polarizer plate 15 serves as the display surface of the liquid crystal display device 50 (on the lower side in FIG. 5).

In the liquid crystal display device 50, the semi-transmissive film 26 is provided on the inner surface of the first glass substrate 21 on the segment side. The semi-transmissive film 26 has a laminate structure, as in FIG. 3, which comprises high refractivity layers A and low refractivity layers B stacked in an alternating relation. An overcoat layer 52 such as of $SiO_2$ (silica) is provided on the semi-transmissive film 26. The transparent electrodes 23 are provided on the overcoat layer 52. The provision of the overcoat layer 52 may be dispensed with.

On the other hand, no semi-transmissive film is provided on the outer or inner surface of the second glass substrate 22 on the common side.

Where the liquid crystal display device 50 is operative in the reflective mode, external illumination light passes through the polarizer plate 15 and the retardation plate 14 into the liquid crystal panel 11. The light is reflected on the semi-transmissive film 26 provided on the inner surface of the first glass substrate 21. The reflected light passes through the liquid crystal panel 11, the retardation plate 14 and the polarizer plate 15, and exits to the display surface side. At this time, the intensity of the light reflected on the semi-transmissive film 26 is increased due to the reflection enhancement effect caused by the laminate structure of the semi-transmissive film 26, so that the brightness of the liquid crystal display device is enhanced.

On the other hand, where the liquid crystal display device 50 is operative in the transmissive mode, the light guided through the light guide plate 16 passes through the polarizer plate 13 and the retardation plate 12, so that the polarization state of the light is changed. The light passes through the liquid crystal panel 11 and then through the retardation plate 14 and the polarizer plate 15, and exits to the display surface side.

Therefore, the liquid crystal display device 50 ensures stable and clear color display both in the reflective mode and in the transmissive mode, like the liquid crystal display device 40 described with reference to FIG. 4. Further, the liquid crystal display device 50 is free from doubling of a display image in the reflective mode, because the light does not pass through the glass substrate 21 on the segment side.

In the embodiments described above, the semi-transmissive film 26 has a nine-layered laminate structure as shown in FIG. 3. The high refractivity layers A and the low refractivity layers B of the semi-transmissive film 26 may constitute a laminate structure of any odd number of layers, e.g., a three-, five-, seven- or eleven-layered laminate structure.

Alternatively, the same numbers of high refractivity layers A and low refractivity layers B may be stacked to form a laminate structure of an even number of layers. The reflectance and refractivity of the semi-transmissive film 26 can be controlled at desired levels by variably setting the number of layers to be stacked to form the laminate structure. Thus, the semi-transmissive film 26 can easily be designed to be imparted with desired levels of reflectance and transmittance, so that the production yield is improved for reduction in the production costs.

In the liquid crystal display device 10 or 40 shown in FIG. 2 or 4, a light scattering layer 35 may be provided between the first glass substrate 21 of the liquid crystal panel 11 and the retardation plate 12. Similarly, in the liquid crystal display device 50 shown in FIG. 5, a light scattering layer 35 may be provided between the second glass substrate 22 of the liquid crystal panel 11 and the retardation plate 14.

Figure 6:
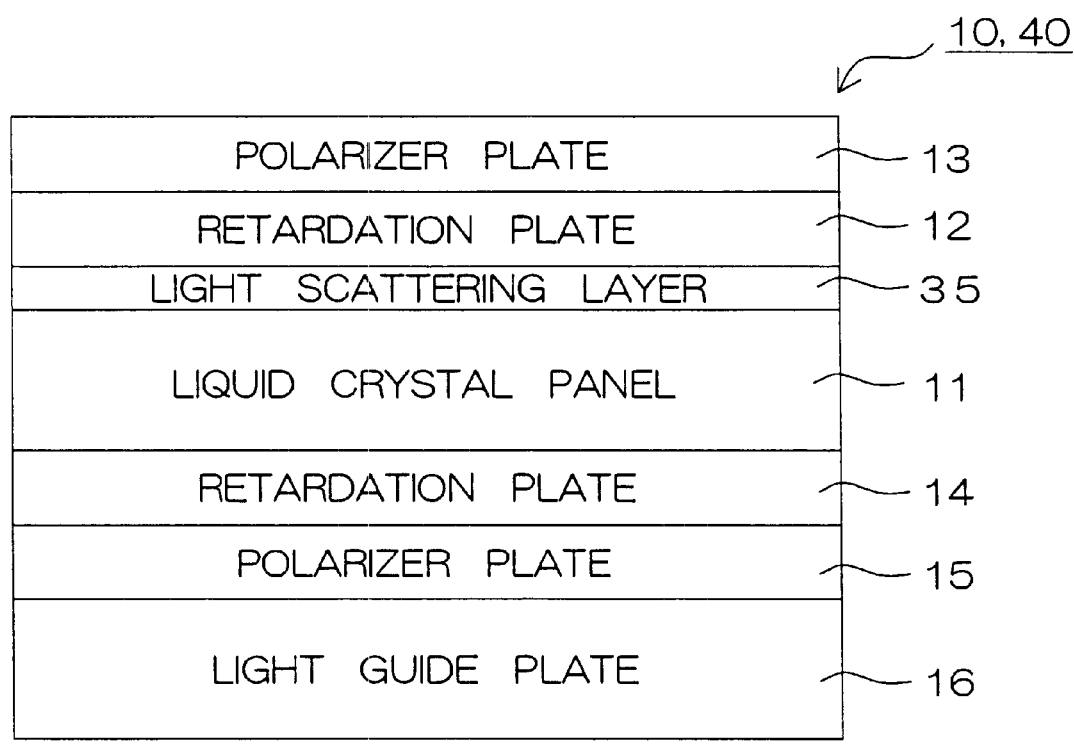
FIG. 6 is a diagram schematically illustrating the construction of the liquid crystal display device 10 or 40 further provided with a light scattering layer 35.
Figure 7:
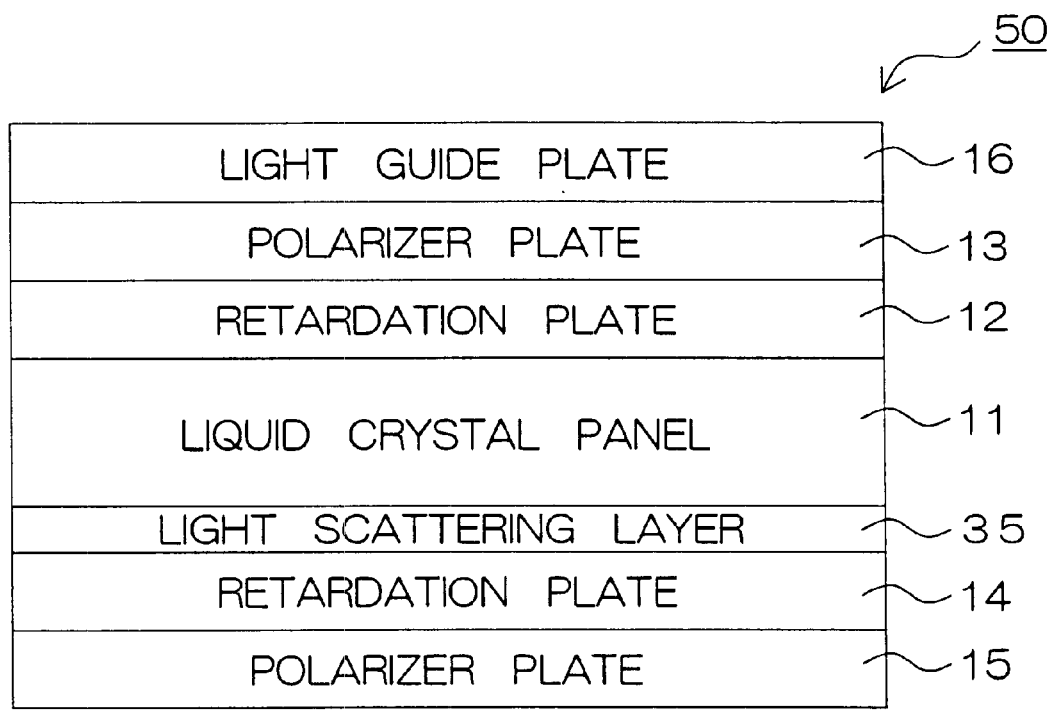
FIG. 7 is a diagram schematically illustrating the construction of the liquid crystal display device 50 further provided with a light scattering layer 35.

FIG. 6 schematically illustrates the construction of the liquid crystal display device 10 or 40 provided with the light scattering layer 35. FIG. 7 schematically illustrates the construction of the liquid crystal display device 50 provided with the light scattering layer 35.

Usable as the light scattering layer 35 is, for example, an IDS (internal diffusion sheet) available from Dainippon Printing Co., Ltd. The IDS comprises a resin sheet, and beads and the like dispersed therein. Alternatively, a planar plate having light scattering undulations formed on a surface thereof may be used as the light scattering layer 35.

The provision of the light scattering layer 35 between the liquid crystal panel and the retardation plate allows the liquid crystal display devices to have a greater viewing angle and a greater viewable area for image display. This is because the light reflected on the semi-transmissive film is scattered by the light scattering layer 35 in directions other than a main reflection direction when the liquid crystal display devices are operative in the reflective mode.

Figure 8:
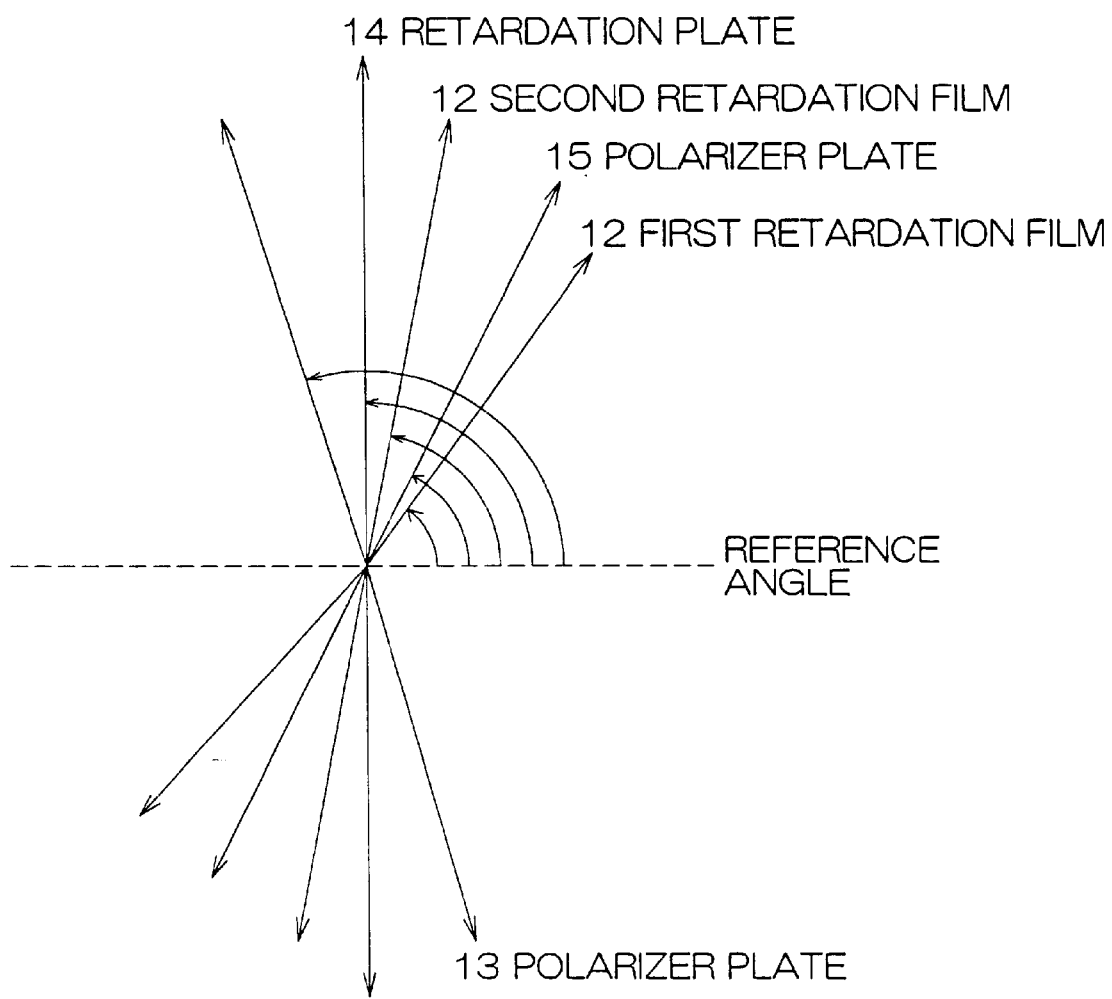
FIG. 8 is a graph showing preferable light transmission conditions in the liquid crystal display devices 10 and 40.

FIG. 8 is a graph showing preferable light transmission conditions in the liquid crystal display device 10 or 40, particularly on the basis of the liquid crystal molecular orientation in the liquid crystal layer 32, the extension axes of the retardation plates and the absorption axes of polarizer plates.

It is herein assumed that the liquid crystal layer 32 in the liquid crystal display device 10 or 40 has a twist angle of 250±15 degrees and an optical path difference Δnd of 850±50 nm. In this case, the retardation plate 12 comprises a first retardation film provided on the side of the polarizer plate 13 and a second retardation film provided on the side of the glass substrate 21. In FIG. 8, extension axes of the retardation plates 12, 14 and absorption axes of the polarizer plates 13, 15 each form an angle which is measured counterclockwise with respect to a mean rubbing direction of the orientation films 25 and 31 as seen from the display surface side.

To obtain the characteristic relationship shown in FIG. 8, it is preferred that: the first retardation film has an optical path difference Δnd of 425±20 nm and an extension axis angle of 25±10 degrees; the second retardation film has an optical path difference Δnd of 425±20 nm and an extension axis angle of 55±10 degrees; the polarizer plate 13 has an absorption axis angle of 137±10 degrees; the retardation plate 14 has an optical path difference Δnd of 140±20 nm and an extension axis angle of 90±10 degrees; and the polarizer plate 15 has an absorption axis angle of 45±10 degrees.

EXAMPLES 1 and 2

The liquid crystal display devices 10 and 40 respectively shown in FIGS. 2 and 4 with the semi-transmissive film 26 of the laminate structure comprising the high refractivity layers A and the low refractivity layers B as shown in FIG. 3 were operated in the transmissive mode and in the reflective mode, and the brightness levels thereof were measured. The results are shown in Table 1. In the liquid crystal display devices 10 and 40, the light scattering film was provided between the liquid crystal panel 11 and the retardation plate 12. In Table 1, Example 1 is the liquid crystal display device 10, and Example 2 is the liquid crystal display device 40.

The five high refractivity layers A oa the semi-transmissive film 26 were each composed of $TiO_2$ and had a thickness of 740, 650, 590, 360 and 560 Å. The four low refractivity layers B were each composed of $SiO_2$ and had a thickness of 1090, 1010, 880 and 620 Å. The high refractivity layers A and the low refractivity layers B constituted a nine-layered laminate structure which had an overall thickness of 6500 Å.

Used as Comparative Example was a liquid crystal display device having substantially the same construction as the liquid crystal display device 10 except that the semi-transmissive film 26 was comprised of a thin aluminum film.

For measurement of the brightness, Minolta's CS-100 was used. When the liquid crystal display devices were operated in the transmissive mode, the same backlight having a predetermined luminance was used. When the liquid crystal display devices were operated in the reflective mode, the same light source was used to illuminate the display surfaces of the liquid crystal display devices at a predetermined angle. The brightness levels of the liquid crystal display devices were measured in the direction of the normal to the display surface.

TABLE 1

|  | Mode | Brightness |
| --- | --- | --- |
| Example 1 | Transmissive mode | 1.10 |
|  | Reflective mode | 1.30 |
| Example 2 | Transmissive mode | 1.20 |
|  | Reflective mode | 1.40 |
| Comparative example | Transmissive mode | 1.00 |
|  | Reflective mode | 1.00 |

The brightness levels of the display devices of Examples 1 and 2 measured in the transmissive and reflective modes are expressed as values relative to the brightness levels (defined as 1.00) of the display device of Comparative Example.

As apparent from Table 1, the display devices of Examples 1 and 2 each exhibited higher levels of brightness both in the transmissive mode and in the reflective mode. Particularly, the liquid crystal display device 40 of Example 2 exhibited much higher brightness levels than the liquid crystal display device 10 of Example 1.

Further, the brightness levels of the liquid crystal display devices 10, 40 provided with no light scattering layer 35 were measured in the transmissive and reflective modes. The results are that the display devices had substantially the same brightness levels in the transmissive mode, but the brightness levels thereof measured in the normal direction in the reflective mode were reduced because the light was scattered mainly in the regular reflection direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display device which is operable both in a reflective mode and in a transmissive mode, comprising:
   a liquid crystal panel comprising a first transparent substrate and a second transparent substrate spaced a predetermined distance from each other in an opposed relation, transparent electrodes and an orientation film provided on each of inner opposed surfaces of the first and second transparent substrates, and a nematic liquid crystal layer provided between the first and second transparent substrates;
   a semi-transmissive dielectric film provided on an inner surface of one of the transparent substrates of the liquid crystal panel, the semi-transmissive dielectric film having a multi-layered laminate structure including high refractivity layers and low refractivity layers stacked in an alternating relation;
   a first retardation plate provided on an outer surface of the first transparent substrate of the liquid crystal panel;
   a first polarizer plate provided on the first retardation plate;
   a second retardation plate provided on an outer surface of the second transparent substrate of the liquid crystal panel;
   a second polarizer plate provided on the second retardation plate;
   backlighting means for internal illumination provided on the polarizer plate provided on a side of the one transparent substrate provided with the semi-transmissive dielectric film; and
   a light scattering layer provided between the other transparent substrate of the liquid crystal panel and the retardation plate on the other transparent substrate;
   wherein the retardation plate provided on the one transparent substrate is conditioned to change the polarization state of the light emitted from the backlighting means used in the transmissive mode to be the same polarization state as the light reflected from the semi-transmissive dielectric film in the reflective mode.

2. A liquid crystal display device as set forth in claim 1, wherein the semi-transmissive dielectric film has an odd-number-layered laminate structure constituted by the high refractivity layers and the low refractivity layers.

3. A liquid crystal display device as set forth in claim 2, wherein the semi-transmissive dielectric film has a multi-layered laminate structure with the outermost layer thereof being constituted by one of the high refractivity layers.

4. A liquid crystal display device as set forth in claim 2, wherein the high refractivity layers each have a refractivity of 2.0 to 2.5, and the low refractivity layers each have a refractivity of 1.3 to 1.6.

5. A liquid crystal display device as set forth in claim 4, wherein the high refractivity layers are each composed of a material selected from the group consisting of $TiO_2$, $ZrO_2$ and $SnO_2$, and the low refractivity layers are each composed of a material selected from the group consisting of $SiO_2$, $AlF_3$ and $CaF_2$.

6. A liquid crystal display device as set forth in claim 4, wherein the high refractivity layers each have a thickness of 25 to 2000 Å, the low refractivity layers each have a thickness of 25 to 2000 Å, and the semi-transmissive dielectric film has an overall thickness of 50 to 12000 Å.

7. A liquid crystal display device as set forth in claim 1,
   wherein the semi-transmissive dielectric film is provided on an inner surface of the second transparent substrate,
   wherein color filters are provided on an inner surface of the semi-transmissive dielectric film,
   wherein the backlighting means for internal illumination is provided on the second polarizer plate,
   wherein an outer surface of the first polarizer plate serves as a display surface of the liquid crystal display device.

8. A liquid crystal display device as set forth in claim 1,
   wherein the semi-transmissive dielectric film is provided on an inner surface of the first transparent substrate,
   wherein color filters are provided on an inner surface of the second transparent substrate,
   wherein the backlighting means for internal illumination is provided on the first polarizer plate,
   wherein an outer surface of the second polarizer plate serves as a display surface of the liquid crystal display device.

* * * * *